(12) United States Patent
Lee et al.

(10) Patent No.: US 12,407,209 B2
(45) Date of Patent: Sep. 2, 2025

(54) MOTOR STATOR HAVING A STATOR CORE WITH A WOUND SHEET CYLINDER STRUCTURE

(71) Applicants: HYUNDAI MOTOR COMPANY, Seoul (KR); KIA CORPORATION, Seoul (KR)

(72) Inventors: Dong Hee Lee, Hwaseong-si (KR); Jae Wan Choi, Anyang-si (KR); Sung Gon Byun, Hwaseong-si (KR); Ji Yeon Kim, Yongin-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 297 days.

(21) Appl. No.: 18/072,363

(22) Filed: Nov. 30, 2022

(65) Prior Publication Data
US 2023/0369933 A1    Nov. 16, 2023

(30) Foreign Application Priority Data
May 13, 2022   (KR) .................... 10-2022-0058803

(51) Int. Cl.
*H02K 3/52*   (2006.01)
*H02K 1/18*   (2006.01)
(Continued)

(52) U.S. Cl.
CPC .............. *H02K 3/522* (2013.01); *H02K 1/182* (2013.01); *H02K 1/20* (2013.01); *H02K 9/19* (2013.01);
(Continued)

(58) Field of Classification Search
CPC .......... H02K 16/02; H02K 1/18; H02K 1/182; H02K 1/16; H02K 1/165; H02K 1/148;
(Continued)

(56) References Cited

U.S. PATENT DOCUMENTS 9,287,755 B2    3/2016   Woolmer et al.
9,614,417 B2 *  4/2017   Lee ...................... H02K 5/203
(Continued)

FOREIGN PATENT DOCUMENTS

EP      3485558 B1    12/2019
JP      2006271049 A  10/2006
KR      102278969 B1   7/2021

*Primary Examiner* — Alexander A Singh
*Assistant Examiner* — Charlie Frank Mann, Jr.
(74) *Attorney, Agent, or Firm* — Lempia Summerfield Katz LLC

(57) ABSTRACT

A stator of a motor has a structure including a plate portion coupled to a support structure for fixing a stator core and protrusions inserted into a bobbin. The support structure for fixing the stator core has a structure into which the protrusions of the stator core are inserted and extend into and on which the plate portion of the stator core is inserted and seated. The plate portion of the stator core is joined to the support structure while being coplanar with the support structure. Accordingly, the distance of a gap between the stator core of the stator and a permanent magnet of a rotor is minimized, thereby improving the performance of the motor.

13 Claims, 7 Drawing Sheets

(51) Int. Cl.
*H02K 1/20* (2006.01)
*H02K 9/19* (2006.01)
*H02K 21/24* (2006.01)

(52) U.S. Cl.
CPC ......... *H02K 21/24* (2013.01); *H02K 2203/12* (2013.01)

(58) Field of Classification Search
CPC .. H02K 3/52; H02K 1/20; H02K 9/19; H02K 3/522; H02K 21/24; H02K 2203/12; H02K 1/28; H02K 1/30
USPC .................................. 310/216.046, 216.047
See application file for complete search history.

(56) References Cited

U.S. PATENT DOCUMENTS

| | | | |
|---|---|---|---|
| 9,742,225 B2 | 8/2017 | Klassen et al. | |
| 9,742,226 B2 | 8/2017 | Klassen | |
| 9,742,227 B2 | 8/2017 | Klassen | |
| 9,748,803 B2 | 8/2017 | Klassen | |
| 9,748,804 B2 | 8/2017 | Klassen | |
| 9,755,463 B2 | 9/2017 | Klassen et al. | |
| 10,069,388 B2 | 9/2018 | Court | |
| 10,075,030 B2 | 9/2018 | Klassen | |
| 10,097,070 B1* | 10/2018 | Boyd | H02K 41/0358 |
| 10,476,323 B2 | 11/2019 | Klassen | |
| 10,951,075 B2 | 3/2021 | Woolmer | |
| 11,043,862 B2 | 6/2021 | Klassen | |
| 11,387,710 B2 | 7/2022 | Vansompel et al. | |
| 11,411,450 B2 | 8/2022 | Purchase et al. | |
| 2004/0046470 A1* | 3/2004 | Decristofaro | H02K 15/026 428/592 |
| 2011/0309694 A1* | 12/2011 | Woolmer | H02K 21/24 310/44 |
| 2013/0147291 A1 | 6/2013 | Woolmer et al. | |
| 2016/0226353 A1* | 8/2016 | Court | B29C 45/14491 |
| 2017/0012480 A1 | 1/2017 | Woolmer | |
| 2017/0047792 A1 | 2/2017 | Klassen et al. | |
| 2017/0047793 A1 | 2/2017 | Klassen et al. | |
| 2017/0047794 A1 | 2/2017 | Klassen | |
| 2017/0047795 A1 | 2/2017 | Klassen | |
| 2017/0047798 A1 | 2/2017 | Klassen | |
| 2017/0047821 A1* | 2/2017 | Klassen | H02K 5/16 |
| 2017/0126079 A1 | 5/2017 | Klassen et al. | |
| 2017/0133891 A1 | 5/2017 | Klassen | |
| 2017/0187254 A1 | 6/2017 | Klassen | |
| 2019/0288584 A1 | 9/2019 | Vansompel | |
| 2020/0144880 A1 | 5/2020 | Klassen | |
| 2020/0161912 A1 | 5/2020 | Klassen | |
| 2021/0194302 A1 | 6/2021 | Purchase et al. | |
| 2021/0273509 A1 | 9/2021 | Klassen | |

* cited by examiner

MOTOR STATOR HAVING A STATOR CORE WITH A WOUND SHEET CYLINDER STRUCTURE

CROSS-REFERENCE TO RELATED APPLICATION

This application claims under 35 U.S.C. § 119(a) the benefit of priority to Korean Patent Application No. 10-2022-0058803, filed on May 13, 2022, the entire contents of which are incorporated herein by reference.

BACKGROUND

(a) Technical Field

The present disclosure relates to a motor stator, and more particularly, to a motor stator having a configuration by which the distance of a gap (hereinafter, referred to as the "gap distance") between the stator and a rotor of a motor may be minimized, thereby improving the performance of the motor.

(b) Background Art

In general, eco-friendly vehicles, such as an electric vehicle, a hybrid electric vehicle, and a fuel cell electric vehicle, are respectively provided with a motor based on an axial flux permanent magnet (AFPM) as a motive power source.

A stator of such a motor may include a stator core in which a plurality of steel sheets are stacked on each other, a support structure formed of a polymer to fix a stator core, a coil wound on the stator core, and the like.

Rotors of the motor are respectively fabricated as a structure obtained by attaching a plurality of permanent magnets to one surface of the rotor core and are disposed on both sides of the stator.

The performance of the motor may be determined depending on the gap distance between the stator core of the stator and each of the permanent magnets of the rotors.

For example, with increases in the gap distance between the stator core of the stator and the permanent magnet of the rotor, there may be degradations in performance of the motor, such as a decrease in motor torque or counter-electromotive force. In contrast, with decreases in the gap distance between the stator core of the stator and the permanent magnet of the rotor, there may be improvements in performance of the motor, such as increases in motor torque or counter-electromotive force.

However, according to the related art, there may be a problem in that the gap distance between the stator core of the stator and the permanent magnet of the rotor may be increased due to the thickness of the support structure for fixing the stator core, thereby degrading the performance of the motor.

SUMMARY

Various embodiments are directed to a stator of a motor in which a stator core is provided with a structure comprised of a plate portion coupled to a support structure for fixing the stator core and protrusions inserted into a bobbin. The support structure for fixing the stator core has a structure into which the protrusions of the stator core are extendedly inserted and into and on which the plate portion of the stator core is inserted and seated. Thus, the plate portion of the stator core is joined to the support structure while being coplanar with the support structure. Accordingly, it is possible to minimize the gap distance between the stator core of the stator and a permanent magnet of a rotor, thereby improving the performance of the motor.

In an embodiment, a motor stator includes a pair of stator cores each having a structure including a plate portion and protrusions provided on one surface of the plate portion. The motor stator also includes stator core-fixing support structures each including through-holes into which the protrusions are inserted to extend and a recess portion into and on which the plate portion is inserted and seated. The motor stator further includes a bobbin having insertion holes therein into which the protrusions, which have passed through the through-holes of the stator core-fixing support structures, are inserted. A coil is wound on an outer surface of the bobbin. The motor stator also includes a housing mounted on inner circumferential portions and outer circumferential portions of the support structures.

According to an implementation, each of the stator cores may be fabricated by forming a cylindrical structure by winding a steel sheet, which may have a predetermined width, a plurality of times and then machining a plurality of cut recess portions on one surface of the cylindrical structure such that the cut recess portions are equidistantly spaced apart from each other in the circumferential direction. Thus, the bottom surfaces of the cut recess portions form the plate portion and the plurality of protrusions are formed to alternate with the cut recess portions.

Each of the support structures may be configured such that an inner ring and an outer ring are integrally connected by a plurality of connecting bars equidistantly disposed in the circumferential direction.

The support structures may be fabricated from one material of polyether ether ketone (PEEK) or polyphthalamide (PPA) among engineered plastic materials by insert injection so as to be joined to the stator cores, respectively.

The through-holes of the support structures may be formed to alternate with the connecting bars of the support structures. The recess portion, into and on which the plate portion of a corresponding one of the stator cores is inserted and seated, may be provided on outer surface portions of the connecting bars connecting the inner ring and the outer ring.

The inner ring and the outer ring may have the same thickness. The thickness of each of the connecting bars may be lower than the thickness of either the inner ring or the outer ring. Also, the recess portion may be formed on the outer surface portions of the connecting bars connecting an outer diameter surface of the inner ring and an inner diameter surface of the outer ring.

The depth of each of the recess portions of the support structures may be the same as the thickness of each of the plate portions of the stator cores.

Thus, when the plate portion of each of the stator cores is inserted into and seated on the recess portion of a corresponding one of the support structures, an outer surface of the plate portion of the stator core and the outer surfaces of the inner ring and the outer ring of the support structure may be disposed coplanar.

The housing may include an inner housing joined to inner diameter surfaces of the support structures by laser welding or thermal fusion. The housing may further include an outer housing joined to outer diameter surfaces of the support structures by laser welding or thermal fusion in order to seal the bobbin on which the coil is wound.

The outer housing may include a cooling oil inlet and a cooling oil outlet configured to cool the coil wound on the bobbin by immersing the coil in cooling oil.

Each of the stator cores may be fabricated as a structure obtained by stacking and joining a plurality of divided steel pieces. A protrusion and a plate portion may be integrated in each steel piece. The protrusions may be configured to extend through the through-holes of a corresponding one of the support structures to be inserted into the insertion holes of the bobbin. The plate portions may be configured to be inserted into and seated on the recess portion of a corresponding one of the support structures.

The protrusion of each of the divided steel pieces of the stator cores may have a coupling recess or a coupling protrusion on a distal end thereof.

Thus, when the protrusions, each having the coupling recess of the divided steel pieces, are inserted into the insertion holes of the bobbin, respectively, from one side of the bobbin, and the protrusions are inserted into the insertion holes of the bobbin, respectively, from the other side of the bobbin, the coupling protrusions may be inserted into and fastened to the coupling recesses, respectively.

Through the above configuration, the present disclosure provides the following effects.

First, the plate portion of each of the stator cores may be joined to the corresponding stator core-fixing support structure while being coplanar with the support structure. Accordingly, it is possible to minimize the gap distances between the stator core of the stator and the permanent magnets of the rotor, thereby improving the performance of the motor. For example, motor torque, counter-electromotive force, or the like may be increased.

Second, due to the configuration by which the bobbin and the coil are sealed inside the housing and the stator cores, the coil may be directly cooled using the cooling oil. For example, the cooling oil may be injected through the cooling oil inlet formed in the outer housing, the coil wound on the bobbin may be cooled by immersing the coil in the cooling oil, the cooling oil may be discharged through the cooling oil outlet formed in the outer housing, and the like.

Third, the stator core-fixing support structures may be formed of a non-magnetic engineered plastic material, thereby preventing an electromagnetic loss, such as an eddy current loss.

BRIEF DESCRIPTION OF THE DRAWINGS

The above and other features of the present disclosure are described in detail with reference to certain examples thereof illustrated in the accompanying drawings which are given herein below by way of illustration only, and thus are not limitative of the present disclosure, and wherein.

DETAILED DESCRIPTION

Hereinafter, embodiments of the present disclosure are described in detail with reference to the accompanying drawings.

Figure 1:
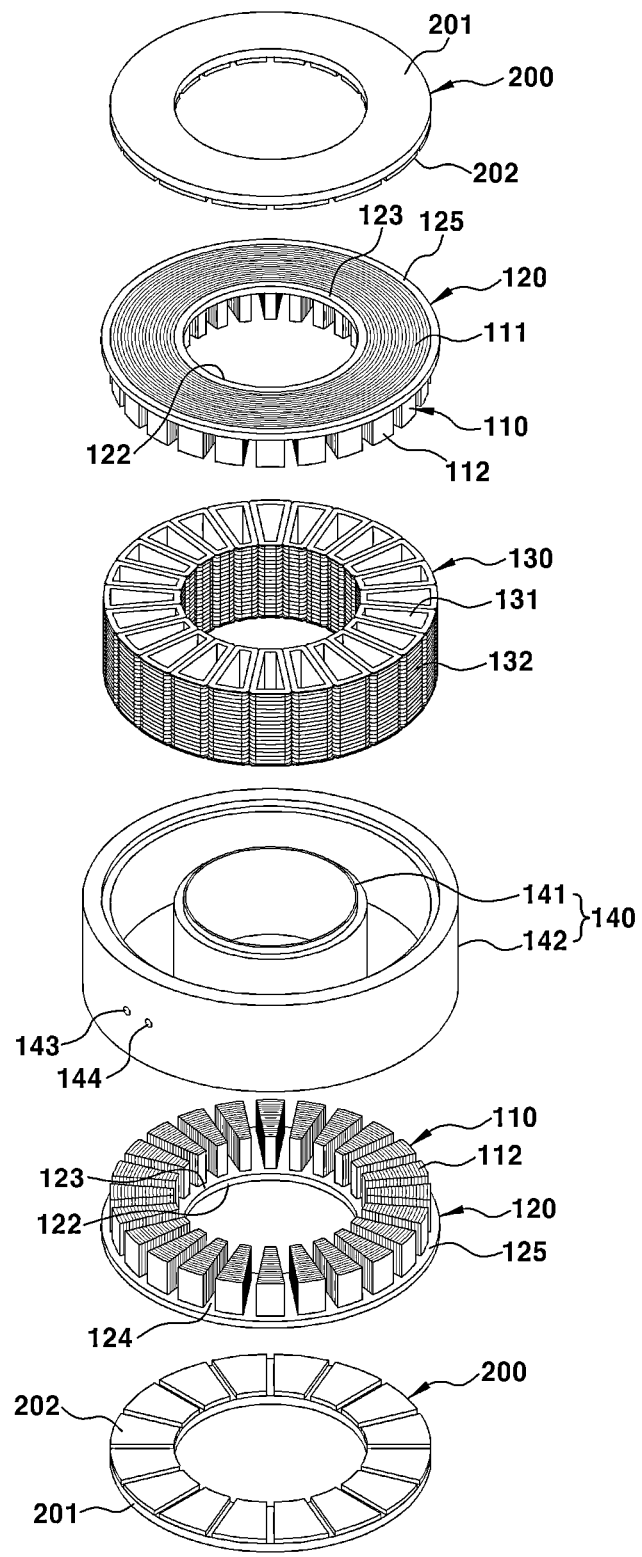
FIG. 1 is an exploded perspective view illustrating a motor including a stator according to the present disclosure.

FIG. 1 in the accompanying drawings is an exploded perspective view illustrating a motor including a stator 100 according to the present disclosure.

As illustrated in FIG. 1, the stator 100 according to the present disclosure includes: a pair of stator cores 110; stator core-fixing support structures (e.g., support structures) 120 respectively coupled to a corresponding one of the stator cores 110; a bobbin 130 on which a coil 132 is wound; a housing 140; and the like.

Each of the stator cores 110 is fabricated with a structure in which protrusions 112 protrude from one surface of a plate portion 111.

Figure 2:
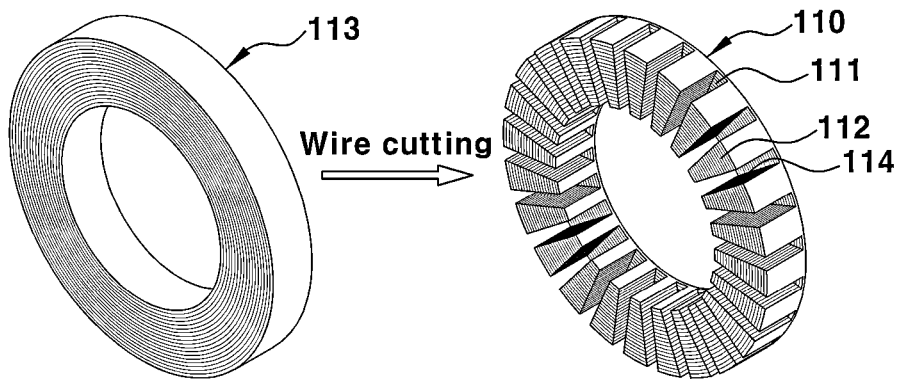
FIG. 2 is a perspective view illustrating the stator core of a stator according to an embodiment of the present disclosure.

According to an embodiment of the present disclosure, as illustrated in FIG. 2, the stator cores 110 may be fabricated by forming a cylindrical structure 113 with a steel sheet, which has a predetermined width, wound a plurality of times around the cylinder structure 113 in the manner of winding a windup spring. The stator cores 110 may then be machined to include a plurality of cut recess portions 114 on one surface of the cylindrical structure 113 by a wire cutting method such that the cut recess portions 114 are equidistantly spaced apart from each other in the circumferential direction.

Consequently, the stator cores 110 respectively including the plurality of cut recess portions 114, the bottom surfaces of which are formed as the plate portion 111, and the plurality of protrusions 112 alternating with the cut recess portions 114, may be realized.

Figure 3:
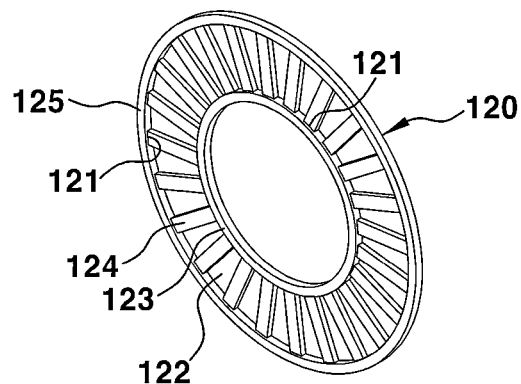
FIG. 3 is a perspective view illustrating the support structure of the stator according to the present disclosure.

As illustrated in FIG. 3, each of the support structures 120 may be fabricated with a structure in which through-holes 122 and a recess portion 121 are formed. The protrusions 112 of the corresponding stator core 110 are inserted into and extend through the through-holes 122 and the plate portion 111 is inserted into and seated on the recess portion 121.

More specifically, each of the support structures 120 is configured such that an inner ring 123 and an outer ring 125 are integrally connected by a plurality of connecting bars 124 equidistantly disposed in the circumferential direction. Thus, the through-holes 122 may be formed to alternate with the connecting bars 124 of the corresponding support structure 120. The protrusions 112 are inserted and extend into the through-holes 122. The recess portion 121 may be provided on outer surface portions of the connecting bars 124 connecting the inner ring 123 and the outer ring 125. The plate portion 111 of the corresponding stator core 110 is inserted into and seated on the recess portion 121.

The inner ring 123 and the outer ring 125 of the support structure 120 have the same thickness and the thickness of each of the connecting bars 124 is lower than the thickness of either the inner ring 123 or the outer ring 125. Thus, the recess portion 121 may be easily formed on the outer surface portions of the connecting bars 124 connecting the outer diameter surface of the inner ring 123 and the inner diameter surface of the outer ring 125.

Particularly, the depth of the recess portion 121 of the support structure 120 is formed to be the same as the thickness of the plate portion 111 of the stator core 110.

Figure 4:
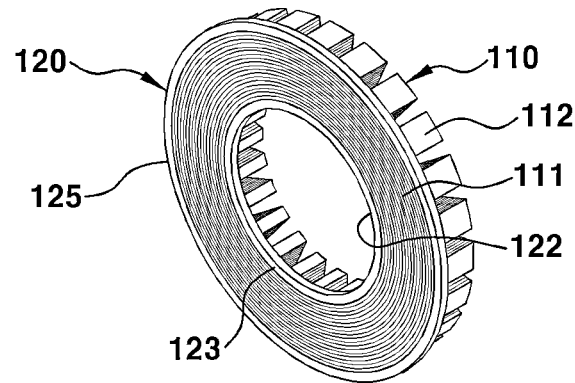
FIG. 4 is a perspective view illustrating the coupling state between the stator core and the support structure of the stator according to the present disclosure.
Figure 5:
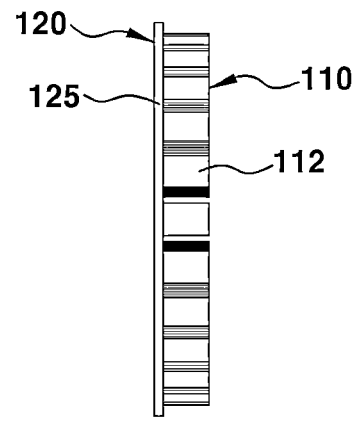
FIG. 5 is a side view illustrating the coupling state between the stator core and the support structure of the stator according to the present disclosure.

Thus, in order to couple the stator core 110 and the support structure 120, when the protrusions 112 of the stator core 110 are inserted and extend into the through-holes 122 of the support structure 120 and the plate portion 111 of the stator core 110 is inserted into and seated on the recess portion 121 of the support structure 120, the outer surface of the plate portion 111 of the stator core 110 and the outer surfaces of the inner ring 123 and the outer ring 125 of the support structure 120 may be disposed coplanar as illustrated in FIGS. 4 and 5.

Particularly, the support structure 120 may be fabricated from a material such as polyether ether ketone (PEEK) or polyphthalamide (PPA) having superior strength and less deformation among engineered plastic materials. The support structure 120 may be fabricated by insert injection so as to be joined to the stator core 110, respectively.

For example, the support structure 120, which has the above-described structure, may be integrally joined to the stator core 110 by insert injection via inserting the stator core 110 into a cavity of an injection mold (not shown) and filling the cavity of the injection mold with the engineered plastic material, such as PEEK or PPA.

Figure 6:
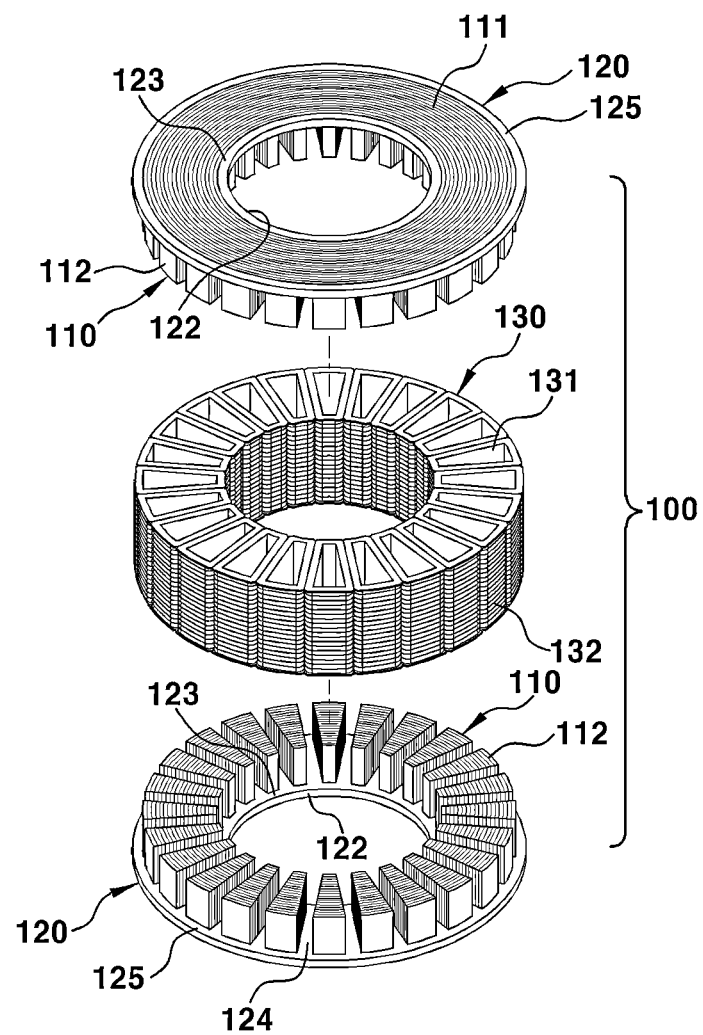
FIG. 6 is a perspective view illustrating a state in which the stator cores coupled to the support structures of the stator are coupled to the bobbin according to the present disclosure.
Figure 7:
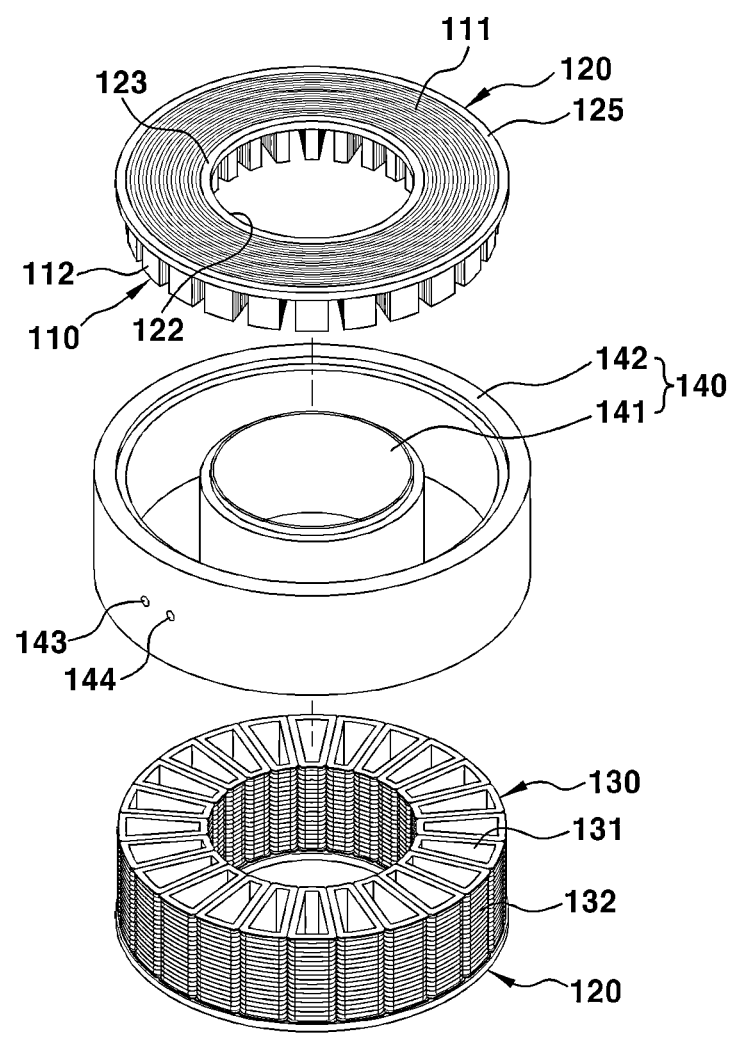
FIG. 7 is a perspective view illustrating a state in which the bobbin, to which the stator cores coupled to the support structures of the stator are coupled, and the housing are coupled according to the present disclosure.

As illustrated in FIGS. 6 and 7, the bobbin 130 may have a structure including insertion holes 131 provided inside the bobbin 130 to be open through both sides. The protrusions 112 of the stator core 110, which have passed through the through-holes 122 of the support structure 120, are inserted into the insertion holes 131 and the coil 132 is wound on the outer surface of the bobbin 130.

The bobbin 130 is provided with a plurality of sections matching the plurality of protrusions 112 of the stator core 110 in a one-to-one relationship.

Thus, the protrusions 112 of the stator cores 110, which have passed through the through-holes 122, are inserted into the half positions of the insertion holes 131, respectively, from one side and the other side of the bobbin 130. The protrusions 112 are thus fastened to the insertion holes 131. Consequently, as illustrated in FIGS. 6 and 7, the support structures 120 and the plate portions 111 of the stator cores 110 are in tight contact with one side portion and the other side portion of the bobbin 130.

The housing 140 may be provided as a structure mounted on the inner circumferential portions and the outer circumferential portions of the support structures 120 so as to seal the bobbin 130, into which the protrusions 112 of the stator cores 110 are inserted, and the coil 132 wound on the outer circumferential surface of the bobbin 130.

Figure 8:
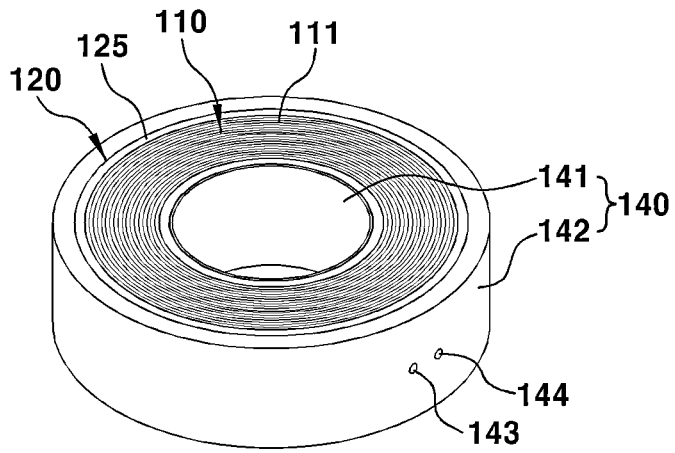
FIG. 8 is a perspective view illustrating an assembled state of the stator according to the present disclosure.

In this regard, as illustrated in FIGS. 7 and 8, the housing 140 may include an inner housing 141 joined to the inner diameter surfaces of the inner rings 123 of the support structures 120 by laser welding or thermal fusion. The housing 140 may further include an outer housing 142 joined to the outer diameter surfaces of the outer rings 125 of the support structures 120 by laser welding or thermal fusion.

In this manner, the pair of stator cores 110 are coupled to the stator core-fixing support structures 120 and the protrusions 112 of each of the stator cores 110 are inserted into and fastened to the bobbin 130 on which the coil 132 is wound. Then the housing 140 including the inner housing 141 and the outer housing 142 is fitted to the resultant structure. Consequently, as illustrated in FIG. 8, the assembly of the stator 100, according to the present disclosure, may be completed.

In addition, as illustrated in FIG. 8, the stator 100 according to the present disclosure has an outer appearance by which the outer surfaces of the plate portions 111 of the stator cores 110, the outer surfaces of the inner rings 123 and the outer rings 125 of the support structures 120, the inner diameter surface of the inner housing 141, and the outer diameter of the outer housing 142 are exposed externally. In addition, the bobbin 130, into which the protrusions 112 of the stator cores 110 are inserted, the coils 132 are wound on the outer surface of the bobbin 130, and the like, are positioned while being sealed inside the stator 100.

Particularly, by molding minute (e.g., small, tiny, or the like) gaps of the stator cores 110 and the support structures 120 with an airtight and watertight molding material, the bobbin 130 may be completely sealed.

Figure 9:
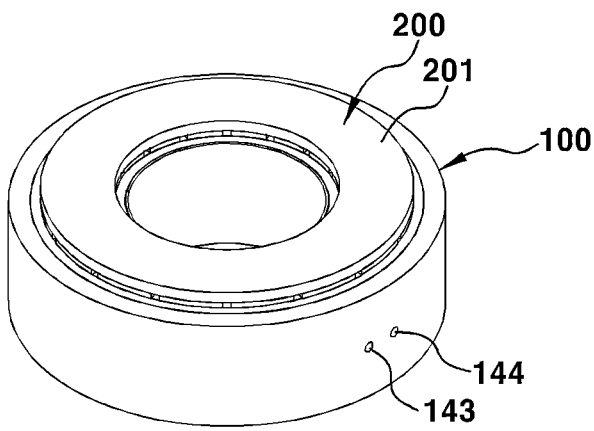
FIG. 9 is a perspective view illustrating a state in which the rotor is disposed adjacent to the stator according to the present disclosure.

As illustrated in FIG. 9, rotors 200 are disposed on both sides of the stator 100 fabricated as described herein at predetermined gap distances from the stator 100. As illustrated in FIG. 1, each of the rotors 200 has a structure including a rotor core 201 and a plurality of permanent magnets 202 attached to the inner surface of the rotor core 201, equidistantly in the circumferential direction.

The performance of the motor may be determined depending on the gap distances between the stator cores 110 of the stator 100 and the permanent magnets 202 of the rotors 200.

Figure 11:
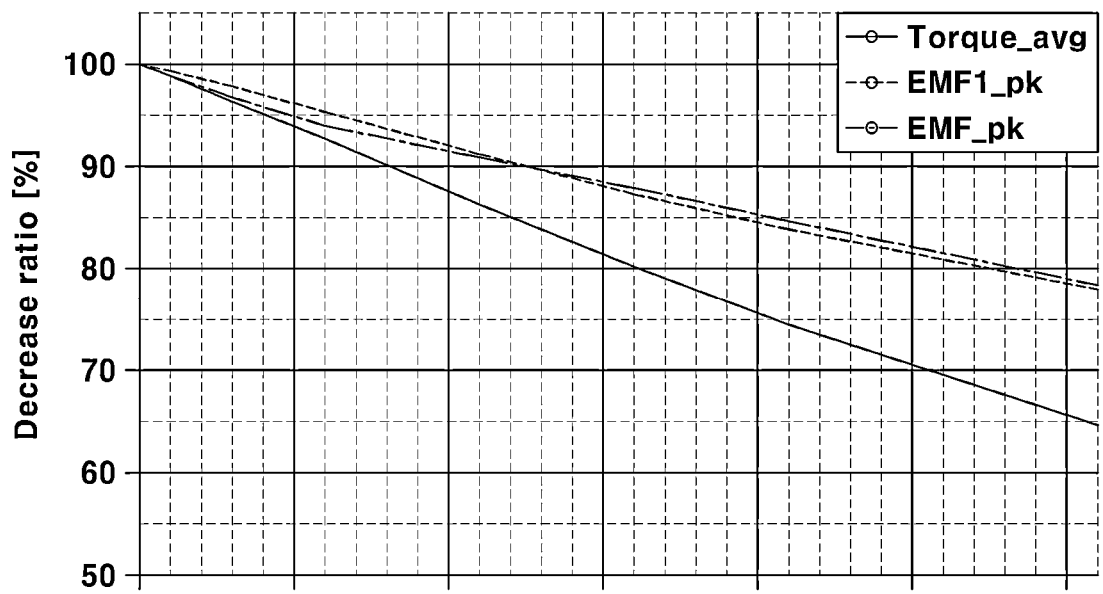
FIG. 11 is a graph illustrating changes in the performance of the motor depending on the gap distance between the stator core and the permanent magnet of the stator according to the present disclosure.

For example, as the gap distances increase between the stator cores 110 of the stator 100 and the permanent magnets 202 of the rotors 200, there may be degradations in performance of the motor. Thus, increasing the gap distances decreases the average torque (Torque_avg) of the motor, the maximum value (EMF1_pk) of the fundamental wave component of the counter-electromotive force, the maximum value (EMF_pk) of the counter-electromotive force, or the like, as illustrated in FIG. 11. In contrast, as the gap distances decrease between the stator cores 110 of the stator 100 and the permanent magnets 202 of the rotors 200, there may be improvements in performance of the motor. Thus, decreasing the gap distances increases the average torque (Torque_avg) of the motor, the maximum value (EMF1_pk) of the fundamental wave component of the counter-electromotive force, the maximum value (EMF_pk) of the counter-electromotive force, or the like, as illustrated in FIG. 11.

Figure 10:
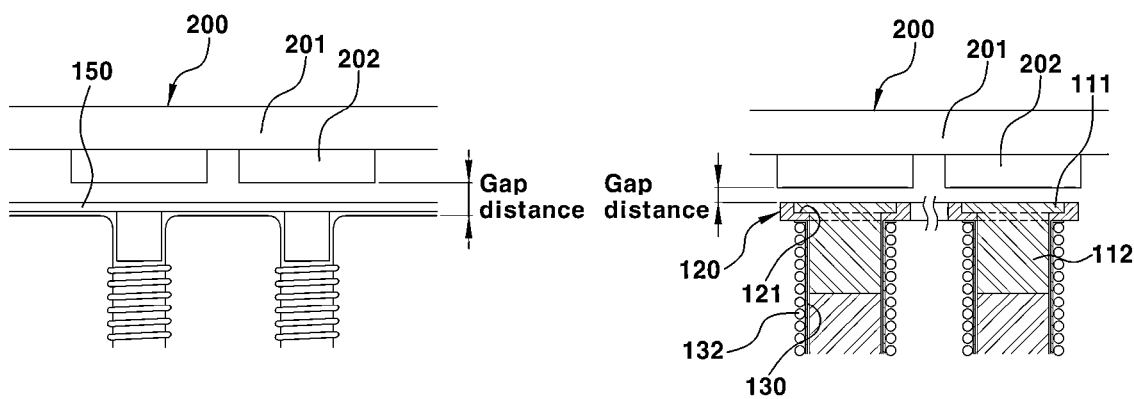
FIG. 10 is a cross-sectional view illustrating, in a comparative manner, a decrease in the gap distance between the stator core and the permanent magnet of the rotor according to the present disclosure.

Referring to the left part of FIG. 10 in the accompanying drawings, when a separate cover 150 connected to the support structure is positioned on the outer surface of each of the stator cores 110 or when the support structure is stacked on the outer surface of each of the stator cores 110, the gap distances between the stator cores 110 and the permanent magnets 202 of the rotors 200 may be increased by the thickness of the cover 150 or the like. Thus, there may be degradations in performance of the motor, such as a decrease in the average torque (Torque_avg) of the motor, the maximum value (EMF1_pk) of the fundamental wave component of the counter-electromotive force, the maximum value (EMF_pk) of the counter-electromotive force, or the like.

In contrast, referring to the right part of FIG. 10 in the accompanying drawings, the plate portion 111 of each of the stator cores 110 according to the present disclosure is inserted into and seated on the recess portion 121 of the corresponding support structure 120 so that the outer surface of the plate portion 111 of the stator core 110 is coplanar with the outer surface of the support structure 120. Thus, the gap distances between the stator cores 110 and the permanent magnets 202 of the rotors 200 may be minimized, thereby improving the performance of the motor. For example, the average torque (Torque_avg) of the motor, the maximum value (EMF1_pk) of the fundamental wave component of the counter-electromotive force, the maximum value (EMF_pk) of the counter-electromotive force, or the like may be increased.

When the stator core-fixing support structures are formed of aluminum (Al), a non-magnetic material, heat dissipation performance may be obtained due to high thermal conductivity of Al. However, since Al is a conductor, an eddy current loss caused by magnetic field changes may be generated.

Thus, the stator core-fixing support structures 120 according to the present disclosure may be formed of a non-magnetic engineered plastic material, thereby preventing an electromagnetic loss, such as an eddy current loss.

However, since the stator core-fixing support structures 120 are formed of a non-magnetic engineered plastic material having a low thermal conductivity, cooling performance for the coil 132, which substantially serves as a heat dissipation component, may degrade.

In order to prevent such a degradation in cooling performance, the bobbin 130 and coil 132 sealed inside the housing 140 and the stator cores 110 may be directly cooled by being immersed in cooling oil.

In this regard, the outer housing 142 is provided with an inlet (e.g., cooling oil inlet) 143 and an outlet (e.g., cooling oil outlet) 144 for the cooling oil. The inlet 143 and the outlet 144 are connected to a cooling device (e.g., a reservoir, an electric pump, or the like) in order to cool the coil 132 wound on the bobbin 130 by immersing the coil 132 in the cooling oil.

Thus, the coil may be directly cooled using the cooling oil by cyclically repeating a cooling process. The cooling may include injecting the cooling oil through the cooling oil inlet 143 formed in the outer housing 142, cooling the coil 132 wound on the bobbin 130 by immersing the coil 132 in the cooling oil, discharging the cooling oil through the cooling oil outlet 144 formed in the outer housing 142, and the like. Consequently, the cooling performance for the coil may be improved.

Figure 12:
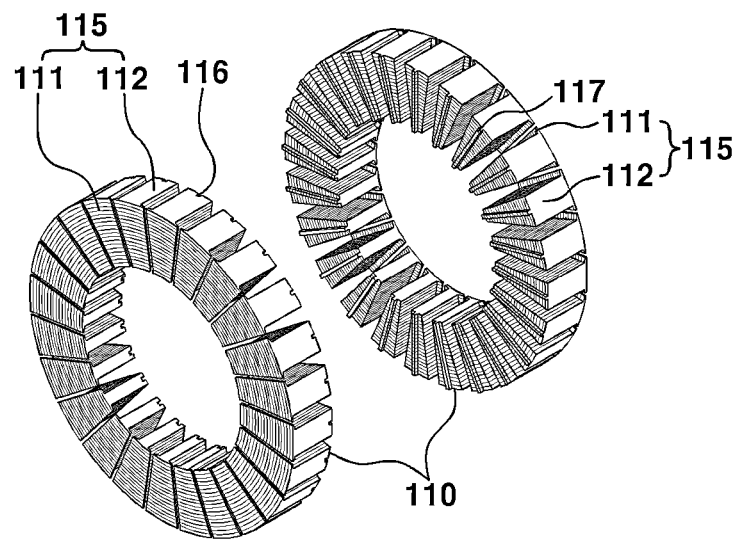
FIG. 12 is a perspective view illustrating stator cores of a stator according to another embodiment of the present disclosure.
Figure 13:
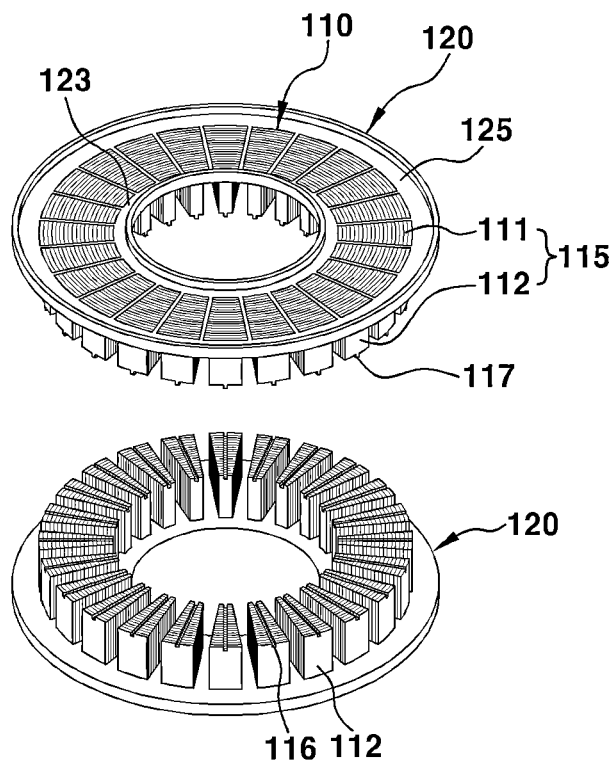
FIG. 13 is a perspective view illustrating the coupling state between the stator cores and support structures according to another embodiment of the present disclosure.

FIG. 12 in the accompanying drawings is a perspective view illustrating stator cores of a stator according to another embodiment of the present disclosure.

As illustrated in FIG. 12, stator cores 110 according to another embodiment of the present disclosure are characterized by being divided into a plurality of pieces, differently from the integral structure of the stator cores 110 according to the former embodiment.

In this regard, as illustrated in FIG. 12, each of the stator cores 110 according to another embodiment of the present disclosure may be fabricated to include a structure obtained by stacking and joining a plurality of divided steel pieces 115, in each of which a protrusion 112 and a plate portion 111 are integrated. The protrusions 112 are configured to extend through the through-holes 122 of a corresponding one of the support structures 120 to be inserted into the insertion holes 131 of the bobbin 130. The plate portions 111 are configured to be inserted into and seated on the recess portion 121 of a corresponding one of the support structures 120.

In addition, the protrusion 112 of each of the divided steel pieces 115 of one of the stator cores 110 according to another embodiment has a coupling recess 116 on the distal end thereof. In contrast, the protrusion 112 of each of the divided steel pieces 115 of the other of the stator cores 110 according to another embodiment has a coupling protrusion 117 on the distal end thereof.

Thus, the plate portions 111 of the divided steel pieces 115 are inserted into and seated on the recess portions 121 of the support structures 120 at the same time that the protrusions 112 of the divided steel pieces 115 are inserted into and extend through the through-holes 122 of the support structures 120. Thus, the outer surfaces of the plate portions 111 of the divided steel pieces 115 and the outer surfaces of the inner ring 123 and the outer ring 125 of the support structures 120 may be disposed coplanar.

Afterward, the protrusions 112 of the divided steel pieces 115, which have passed through the through-holes 122 of the support structures 120, may be inserted into and fastened to the insertion holes 131, respectively, from one side and the other side of the bobbin 130.

Figure 14:
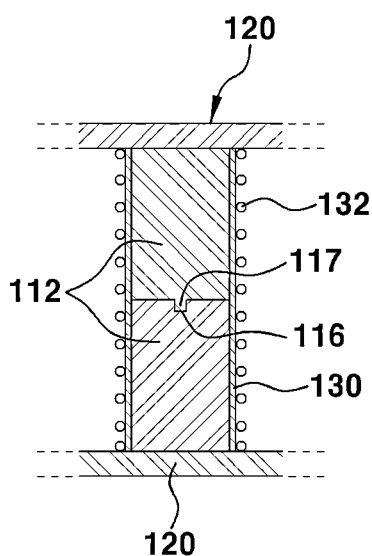
FIG. 14 is a cross-sectional view illustrating a main-part cross-sectional view illustrating a state in which a protrusion of the stator core is inserted into and engaged with the inside of the bobbin according to another embodiment of the present disclosure.

Thus, the protrusions 112 each have the coupling recess 116 of the divided steel pieces 115 inserted into the insertion holes 131 of the bobbin 130, respectively, from one side of the bobbin 130, and the protrusions 112 each have the coupling protrusion 117 of the divided steel pieces 115 inserted into the insertion holes 131 of the bobbin 130, respectively, from the other side of the bobbin 130. As a result, the coupling protrusions 117 may be inserted into and fastened to the coupling recesses 116, respectively, as illustrated in FIG. 14. In this manner, the divided steel pieces 115 facing each other may be coupled to each other, thereby preventing the divided steel pieces 115 from moving.

Accordingly, the support structures 120 and the plate portions 111 of the divided steel pieces 115 of the stator cores 110 are in tight contact with one side and the other side of the bobbin 130. The plate portions 111 of the divided steel pieces 115 are inserted into and seated on the recess portions 121 of the support structures 120 so as to be coplanar with the outer surfaces of the support structures 120. In the same manner, the gap distances between the plate portions 111 of the stator cores 110 and the permanent magnets 202 of the rotors 200 may be minimized.

The various embodiments of the present disclosure have been described herein in detail as set forth above, but the scope of the present disclosure is not limited to the described embodiments. It should be apparent to those having ordinary skill in the art that various modifications and improvements made without departing from the technical spirit of the present disclosure defined in the appended claims are also included in the scope of the present disclosure.

What is claimed is:

1. A motor stator comprising:
a pair of stator cores, each stator core of the pair of stator cores having a structure including a plate portion and a plurality of protrusions provided on one surface of the plate portion;
a pair of support structures for fixing the plurality of stator cores, each support structure of the pair of support structures including a plurality of through-holes into which the plurality of protrusions is inserted and a recess portion into which the plate portion is inserted and seated;
a bobbin having a plurality of insertion holes formed therein into which each of the plurality of protrusions, having respectively passed through each of the plurality of through-holes of the pair of support structures, is inserted with a coil wound on an outer surface thereof; and
a housing structure including an inner housing mounted on inner circumferences of the pair of support structures and an outer housing mounted on outer circumferences of the pair of support structures,
wherein the housing includes an inner housing joined to inner diameter surfaces of the pair of support structures and an outer housing joined to outer diameter surfaces of the pair of support structures in order to seal the bobbin on which the coil is wound,
wherein the inner housing is joined by laser welding or thermal fusion to the inner diameter surfaces of the pair of support structures, and
wherein the outer housing is joined by laser welding or thermal fusion to the outer diameter surfaces of the pair of support structures.

2. The motor stator of claim 1, wherein each of the stator cores has a cylindrical structure with a steel sheet, having a predetermined width, wound a plurality of times around the cylindrical structure and a plurality of cut recess portions on one surface of the cylindrical structure such that the cut recess portions are equidistantly spaced apart from each other in a circumferential direction, so that bottom surfaces of the cut recess portions form the plate portion and the plurality of protrusions are formed to alternate with the cut recess portions.

3. The motor stator of claim 1, wherein each of the support structures is configured such that an inner ring and an outer ring are integrally connected by a plurality of connecting bars equidistantly disposed in a circumferential direction.

4. The motor stator of claim 3, wherein the pair of support structures is fabricated from an engineered plastic material and insert injection molded to be joined to the pair of stator cores, respectively.

5. The motor stator of claim 4, wherein the engineered plastic material is a polyether ether ketone (PEEK) or a polyphthalamide (PPA).

6. The motor stator of claim 3, wherein the through-holes of the support structures are formed to alternate with the connecting bars of the support structures, wherein the recess portion is provided on outer surface portions of the connecting bars connecting the inner ring and the outer ring, and wherein the plate portion of a corresponding one of the pair of stator cores is inserted into and seated on the recess portion.

7. The motor stator of claim 6, wherein the inner ring and the outer ring have a same thickness, a thickness of each of the connecting bars is lower than the thickness of either the inner ring or the outer ring, and the recess portion is formed on the outer surface portions of the connecting bars connecting an outer diameter surface of the inner ring and an inner diameter surface of the outer ring.

8. The motor stator of claim 6, wherein the depth of each of the recess portions of the support structures is the same as a thickness of each of the plate portions of the stator cores.

9. The motor stator of claim 6, wherein, when the plate portion of each of the stator cores is inserted into and seated on the recess portion of a corresponding one of the support structures, an outer surface of the plate portion of the stator core and the outer surfaces of the inner ring and the outer ring of the support structure are disposed coplanar.

10. The motor stator of claim 1, wherein the outer housing comprises a cooling oil inlet and a cooling oil outlet configured to cool the coil wound on the bobbin by immersing the coil in cooling oil.

11. The motor stator of claim 1, wherein each stator core includes a plurality of divided steel pieces, stacked and joined, and in each of which a protrusion and a plate portion are integrated, wherein the protrusions are configured to extend through the through-holes of a corresponding one of the pair of support structures and be inserted into the insertion holes of the bobbin, and wherein the plate portions are configured to be inserted into and seated on the recess portion of a corresponding one of the pair of support structures.

12. The motor stator of claim 11, wherein the protrusion of each of the divided steel pieces of the stator cores has a coupling recess or a coupling protrusion on a distal end thereof.

13. The motor stator of claim 12, wherein, when the protrusions each having the coupling recess of the divided steel pieces are inserted into the insertion holes of the bobbin, respectively, from one side of the bobbin and the protrusions each having the coupling protrusion of the divided steel pieces are inserted into the insertion holes of the bobbin, respectively, from the other side of the bobbin, the coupling protrusions are inserted into and fastened to the coupling recesses, respectively.

* * * * *